US012598082B2

(12) United States Patent
Dangi et al.

(10) Patent No.: US 12,598,082 B2
(45) Date of Patent: *Apr. 7, 2026

(54) CRYPTOGRAPHIC METHOD TO CERTIFY RETENTION LOCK STATUS FOR OPAQUE DATA IN A BACKUP SYSTEM

(71) Applicant: Dell Products L.P., Round Rock, TX (US)

(72) Inventors: Salil Dangi, Mission Viejo, CA (US); Nitin Madan, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 107 days.

This patent is subject to a terminal disclaimer.

(21) Appl. No.: 18/418,938

(22) Filed: Jan. 22, 2024

(65) Prior Publication Data

US 2025/0112789 A1 Apr. 3, 2025

Related U.S. Application Data

(63) Continuation-in-part of application No. 18/478,610, filed on Sep. 29, 2023.

(51) Int. Cl.
*G06F 21/60* (2013.01)
*G06F 11/1446* (2026.01)
*G06F 16/11* (2019.01)
*H04L 9/32* (2006.01)

(52) U.S. Cl.
CPC ........ *H04L 9/3268* (2013.01); *G06F 11/1464* (2013.01); *G06F 16/125* (2019.01); *H04L 9/3213* (2013.01); *G06F 2201/80* (2013.01)

(58) Field of Classification Search
CPC .. H04L 9/3268; H04L 9/3213; G06F 11/1464; G06F 16/125; G06F 2201/80; G06F 11/1448
See application file for complete search history.

(56) References Cited

U.S. PATENT DOCUMENTS

| | | | | |
|---|---|---|---|---|
| 8,417,954 B1 * | 4/2013 | Sagal | ..................... | G06F 21/64 |
| | | | | 713/176 |
| 8,572,758 B1 * | 10/2013 | Clifford | .............. | G06F 21/6218 |
| | | | | 726/30 |
| 9,152,666 B2 * | 10/2015 | Lin | ..................... | G06F 16/2343 |
| 10,949,088 B1 * | 3/2021 | Chinthekindi | ...... | G06F 16/1752 |
| 11,341,234 B1 * | 5/2022 | Voss | ..................... | G06F 11/1464 |
| 11,620,393 B1 * | 4/2023 | Premaradj | .......... | G06F 21/6209 |
| | | | | 713/165 |
| 2004/0078568 A1 * | 4/2004 | Pham | .................. | G06F 21/6218 |
| | | | | 713/165 |

(Continued)

*Primary Examiner* — Meng Li
(74) *Attorney, Agent, or Firm* — Staniford Tomita LLP

(57) ABSTRACT

The retention lock (RL) status for a backup file stored in a storage target is certified by obtaining the RL status and encrypting it using an encryption key process to create a certified RL status. This signs the RL status by the entity storing the backup file, rather than an application setting the retention lock. The certified RL status is provided as a token to backup software of a deduplication backup system, wherein it can be made available for inspection and audit. The data may include opaque data that is data not interpreted by the filesystem. The request for RL status includes the opaque data, which is returned as part of the response, and which can be returned in part as cleartext.

17 Claims, 10 Drawing Sheets

(56) References Cited

U.S. PATENT DOCUMENTS

| | | | |
|---|---|---|---|
| 2007/0016771 A1* | 1/2007 | Allison | H04L 9/0897 |
| | | | 713/165 |
| 2008/0101596 A1* | 5/2008 | Cerruti | G06F 21/602 |
| | | | 380/30 |
| 2008/0263363 A1* | 10/2008 | Jueneman | H04L 9/0877 |
| | | | 713/184 |
| 2009/0106549 A1* | 4/2009 | Mohamed | G06F 21/6218 |
| | | | 713/156 |
| 2016/0277374 A1* | 9/2016 | Reid | H04L 63/0435 |
| 2017/0293766 A1* | 10/2017 | Schnjakin | G06F 21/602 |
| 2019/0050398 A1* | 2/2019 | Li | H04L 9/30 |
| 2021/0263809 A1* | 8/2021 | Zhang | G06F 11/1451 |
| 2021/0320787 A1* | 10/2021 | Almeida | G06F 21/79 |
| 2022/0083514 A1* | 3/2022 | Rath | G06F 16/1774 |
| 2022/0114062 A1* | 4/2022 | Madan | G06F 11/1469 |
| 2022/0398332 A1* | 12/2022 | Nelson | G06F 21/602 |
| 2023/0077938 A1* | 3/2023 | Yarlagadda | G06F 16/125 |
| | | | 707/662 |
| 2023/0147671 A1* | 5/2023 | Narulkar | G06F 16/1748 |
| | | | 707/692 |

* cited by examiner

100

400

500

700

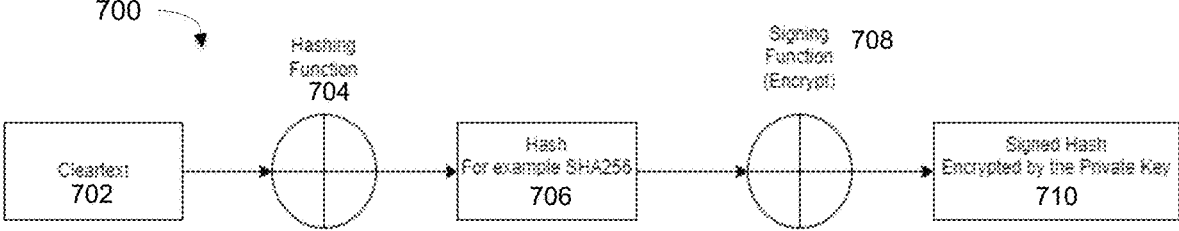

Hashing
Function
704

Signing
Function
(Encrypt)
708

Clearfext
702

Hash
For example SHA256
706

Signed Hash
Encrypted by the Private Key
710

712   Stored in Backup Catalog: Token type 1

Encrypted Hash
710

ClearText
702

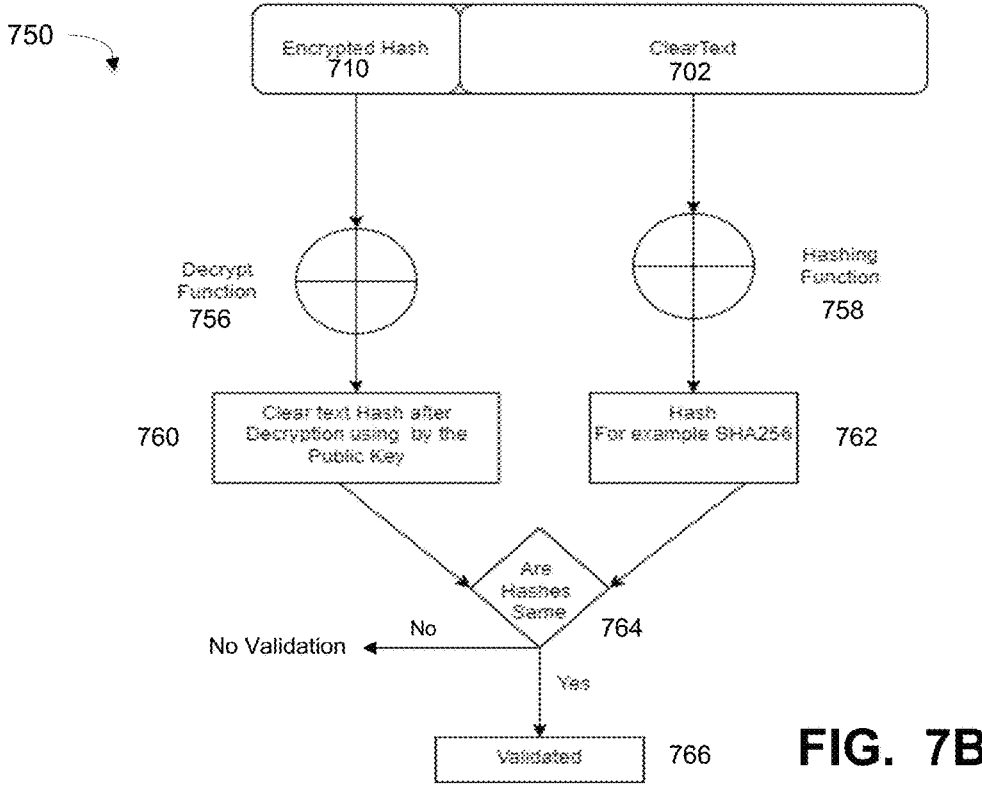

Encrypted Hash
710

ClearText
702

Decrypt
Function
756

Hashing
Function
758

760   Clear text Hash after
Decryption using  by the
Public Key

Hash
For example SHA256   762

Are
Hashes
Same   764

No Validation ◄——— No

Yes

Validated   766

Encryption
Function
804

Cleartext
802

Encrypted Text  by the Private
Key
806

808    Stored in Backup Catalog: Token type 2

Encrypted Text
806

850

Encrypted Text
806

Decrypt
Function
812

Clear text after
Decryption using the Public
Key                814

900

CRYPTOGRAPHIC METHOD TO CERTIFY RETENTION LOCK STATUS FOR OPAQUE DATA IN A BACKUP SYSTEM

CROSS-REFERENCE TO RELATED APPLICATIONS

This application is a Continuation-In-Part application and claims priority to U.S. patent application Ser. No. 18/478, 610 filed on Sep. 29, 2023 and entitled "Cryptographic Method to Certify Retention Lock Status for Auditing in a Backup System," which is assigned to the assignee of the present application, and which is hereby incorporated by reference in its entirety.

TECHNICAL FIELD

This invention relates generally to locking data for protection, and more particularly to capturing and guaranteeing retention lock status for auditing.

BACKGROUND OF THE INVENTION

Storing data in a data protection system often invokes corporate governance or compliance standards storage periods and protection measures. Certain regulations, such as SEC 17a-4(f), require that data storage vendors have a method to store electronic records in a non-rewriteable and non-erasable format. This is normally accomplished through the use of retention locking (RL) mechanisms that prevent alteration or erasure of the records for their required retention period. To further meet these regulations, storage vendors must also provide a method to audit the retention state of a given electronic record, which can be quite a significant challenge. To audit the files on a storage filesystem, the audit process must enumerate the filesystem and confirm that the file is protected and un-modified for the applicable time period. The retention state must also be compared against some other secure source where the state is maintained.

Some backup systems (e.g., PowerProtect Data Domain, PPDD) have a certain understanding of the files stored and provide retention locking based on instructions from the backup application. Retention locking is used to store data in an immutable, indelible form for a certain duration after it is written, such as on the order of weeks to years. After the retention duration expires, the backup appliances cleanup the backup and delete the expired files on the backup server. The backup applications also keep a catalog of the files which have been stored on the backup appliance. These catalogs, however, are vulnerable to malicious corruption themselves.

What is needed, therefore, is a secure method to keep the state of retention locks for files in a catalog so that they can be used for audit purposes.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of Dell EMC Corporation.

BRIEF SUMMARY OF EMBODIMENTS

Embodiments are directed to methods to certify retention lock status for files backed up in a deduplication backup system by retention locking a backup file stored in a storage target to generate a lock status, and encrypting the lock status in the storage target to sign the retention lock status by an entity storing the backup file. A backup software as executed by a backup server creates a catalog storing file information and the encrypted lock status; and provides the file information and encrypted lock status to an auditor requesting certification of the lock status of the backup file. Cryptographic methods are used to certify the status of retention locks as requested by the backup application (backup software) and store this status as part of the backup application catalog. Such a catalog can then be used to audit the state of file retention. The data stored and retention locked may be unstructured data, such as application files (documents), e-mails, etc., which must be retained due to certain required retention policies, such as corporate governance rules and regulatory compliance (e.g. SEC 17a-4(f)) standards.

The encryption may comprise of encrypting of the hash of the payload comprising cleartext status of retention lock setting using a private key of a filesystem or encrypting a payload comprising cleartext status of retention lock setting using a private key of a filesystem. The certified retention lock status comprises of either the encrypted hash along with the cleartext of retention lock status, or the encrypted retention lock status. The certified retention lock status is also referred as token (token type 1 or token type 2) in the document below.

The data associated with the files may include opaque data that is data not interpreted by the filesystem. In this case, certain retention lock status information can be returned as cleartext without encryption of every response data element.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 7A illustrates a cryptographic certificate process for the first type of token (encrypted hash plus cleartext), under some embodiments.

FIG. 7B illustrates an audit process for the first type of token (encrypted hash plus cleartext), under some embodiments.

DETAILED DESCRIPTION

Figure 1:
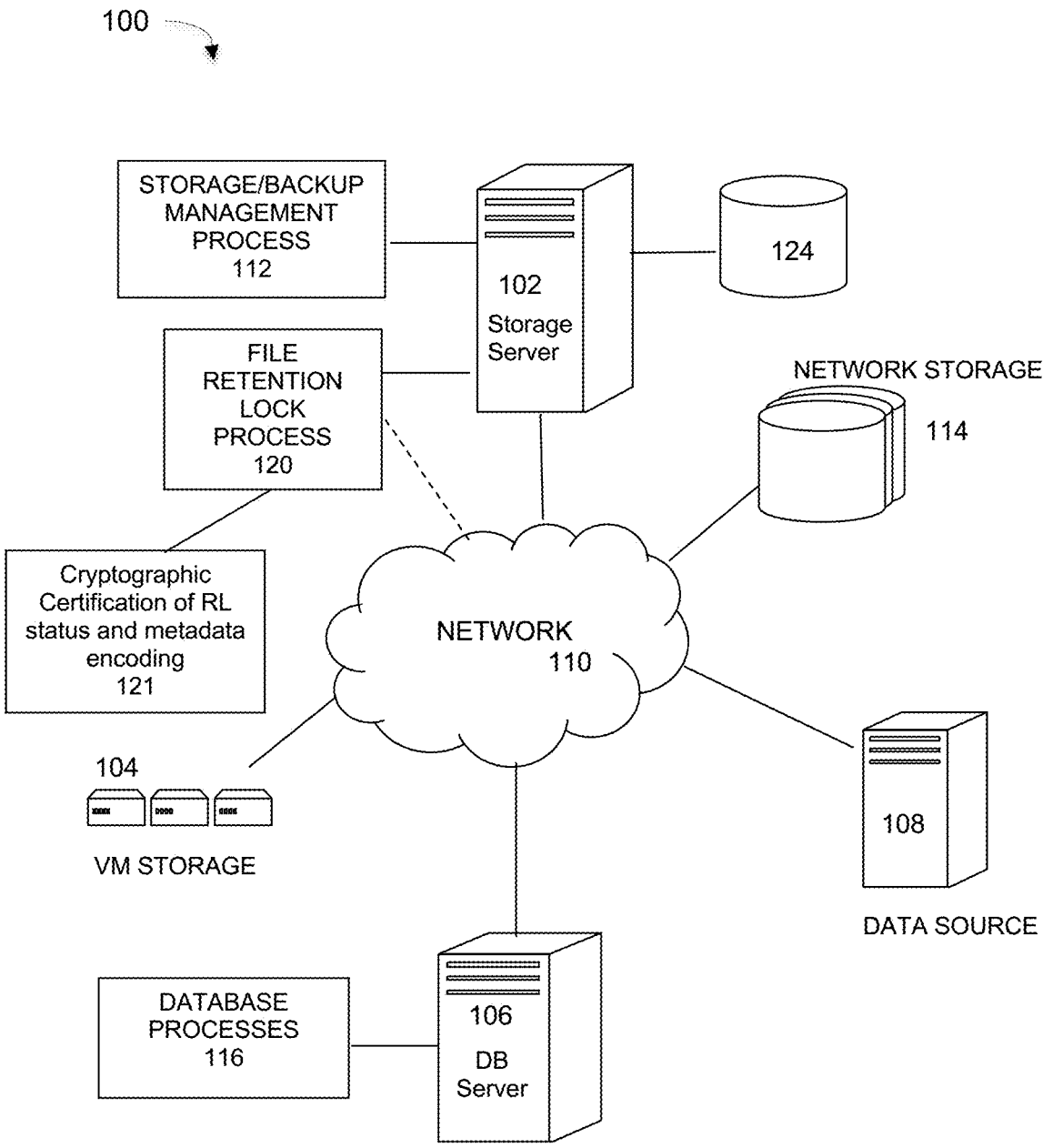
FIG. 1 is a diagram of a network implementing improved retention lock reporting processes for protected data, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software development and deployment in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are directed to a system and method to use cryptographic methods to capture and certify the state of retention lock as requested by the backup application and store this state as part of the backup application catalog. Such a catalog can then be used to audit the state of file retention.

FIG. 1 illustrates a computer network system that implements one or more embodiments of a data protection system implementing a retention lock for protected data, under some embodiments. In system 100, a storage server 102 executes a data storage or backup management process 112 that coordinates or manages the backup of data from one or more data sources to storage devices, such as network storage, client storage, and/or virtual storage devices. With regard to virtual storage, any number of virtual machines (VMs) 104 or groups of VMs (e.g., organized into virtual centers) may be provided to serve as data sources. The sourced data may be any appropriate data, such as database data that is part of a database management system 116.

The network server computers are coupled directly or indirectly to the data storage 114, VMs 104, and the data sources and other resources through network 110, which is typically a LAN, WAN or other appropriate network, but may also include part of a cloud network. Network 110 provides connectivity to the various systems, components, and resources of system 100, and may be implemented using protocols such as Transmission Control Protocol (TCP) and/or Internet Protocol (IP), well known in the relevant arts.

The data generated or sourced by system 100 and transmitted over network 110 may be stored in any number of persistent storage locations and devices. In a backup case, the backup process 112 causes or facilitates the backup of this data from other storage devices of the network, such as network storage 114, which may at least be partially implemented through storage device arrays, such as RAID components. In an embodiment system 100 may be configured to use various storage architectures such as storage area network (SAN), Network-attached Storage (NAS), or Direct-attached Storage (DAS) as large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by Dell EMC Corporation. However, other similar backup and storage systems are also possible.

As shown in FIG. 1, system 100 includes file retention lock process 120 that locks selected files against modification or deletion to protect these files from unintended or unwanted changes, or malicious tampering. Retention locking is typically enabled by user selection at time of file creation or modification to lock the file for specified period of time, and which may be extended by the user, if necessary. Retention locking may also be executed by the storage server 102 as part of backup management process 112.

The data sourced in system 100 may be unstructured data, such as application files (documents), e-mails, and so on. After long periods of time, such data is typically not accessed often, yet must be retained due to certain required retention policies. As such data can often include sensitive business or personal information, it must also be protected against unwanted access and disclosure, as well as protected against deletion or modification. In general, the file retention lock process includes software that allows a user to set the lock on a file to prevent deletion or modification of a file for a set number of years, such as up to 70 years, or similar time periods. The lock is set until the expiration period (expiry) during which, no one is able to modify or delete the file, but after the expiration period has lapsed, the file can be freely modified/deleted.

Figure 2:
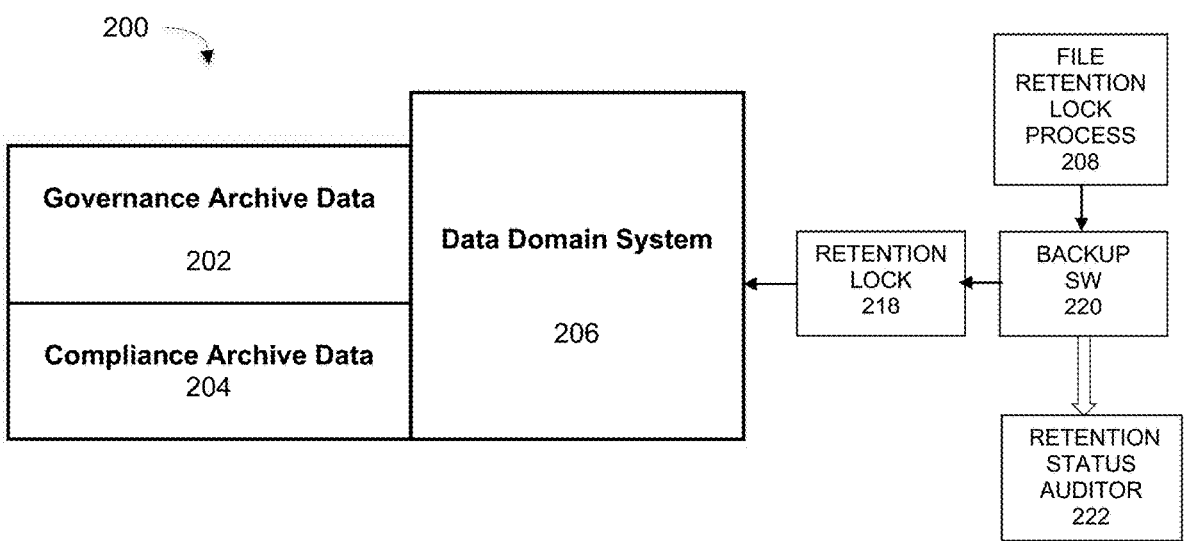
FIG. 2 illustrates the incorporation of the compliance and governance standards in a deduplication backup system, under some embodiments.

Files may be retention locked for a variety of reasons, and one main reason is to comply with certain regulatory and/or governmental requirements, as mentioned above. FIG. 2 illustrates the incorporation of the compliance and governance standards in a backup system, under some embodiments. For the embodiment of system 200, a retention lock process is used that can support both governance retention rules to governance archive data 202 and compliance retention rules to compliance archive data 204 in a backup system 206, such as a PowerProtect Data Domain (PPDD) backup system. This allows users to consolidate both governance and compliance data on a single storage system.

For governance archive data 202, the corporate governance standards for secure archive data retention are generally considered to be the more lenient standards. They allow for flexible control of retention policies but not at the expense of maintaining the integrity of the data during the retention period. These standards apply to environments where the system administrator is trusted with his administrative actions. The storage system 206 must securely retain stored data per corporate governance standards and needs to meet the following set of requirements: (1) allow stored files to be committed for a specific period of time during which the contents of the secured file cannot be deleted or modified; (2) allow for deletion of the retained data once the retention period expires; (3) allow for ease of integration with existing archiving application infrastructure through industry standard protocols such as CIFS and NFS; (4) provide flexible policies such as allow extending the retention period of a secured file, revert of locked state of the stored file, etc.; and (5) provide the ability to replicate both the retained files and retention period attribute to a destination site to meet the DR needs for the stored data.

The storage server 102 of FIG. 1 may be part of a deduplication backup system, such as a PowerProtect Data Domain (PPDD) system. FIG. 2 illustrates a Data Domain system using a retention locking process, under some embodiments. As shown in FIG. 2, Data Domain system 206 receives data from the backup software 220, for storage (for any period) and that may or may not implement deduplication processes. The backup software 220 requests, and the Data Domain System 206 applies one or more policies (e.g., conforming to governance 202 or compliance rules 204 for storing the data.

Data that is to be retention locked is requested through the process 208, which applies the lock 218 to the corresponding data object or element (e.g., directory, file, filesystem, etc.) after writing to the Data Domain system 206. The retention lock process is typically initiated directly by the user to lock the data object, but it may also be invoked by a server or filesystem process.

As stated above, backup application keep a catalog of the files which have been stored on the backup appliance, but that may be vulnerable to attack, malicious modification, or corruption. Embodiments of system 100 provide a secure method to keep the state of the retention lock for each file in the catalog so that it can be used for certain audit processes 222. A method uses cryptography to capture and guarantee the state of retention lock as requested by the backup application and store it as part of the backup application catalog with the backup metadata. The catalog can then be used to audit the state of file retention through the setting or non-setting of retention locks. The auditor or audit process 222 is thus used to validate the retention lock status of the stored files, and can be performed as a check on the metadata and/or data of a file, as explained in further detail below.

In backup systems using retention locking copies of backups, it is important to be able to prove that the backup application performed the retention lock calls, and that the backup metadata and backup files are untampered. To illustrate the problem, assume there were two backups (B1, and B2) taken by a backup application with a Data Domain (DD) target, and that B1 and B2 were retention locked for retention times r1 and r2 respectively. The catalog would be updated to reflect that B1 and B2 were written to DD with retention times r1 and r2. The only foolproof way to audit this lock status is to query the storage target about the retention time for B1 and B2. The files must exist if r1 and r2 are greater than or equal to than the current time, and they may have the retention time times of r1 and r2. Even with this information, however, there needs to be some place to record the intent, i.e., that the backups B1 and B2 were intended to be locked for retention times r1 and r2. Since the backups are stored and locked by the backup application it is only natural to store the intent and lock duration with the backup application. In general, backup applications store their metadata in the backup catalog. If there is an audit of this backup catalog, it is important to ensure that the catalog is not vulnerable to malicious or accidental edits.

This shows that the system needs to make sure that the content describing the retention lock status is certified, and also that the content describing the retention lock status is immune to an attack, so if the content describing the retention lock status were to be improperly changed, this tampering must be discovered.

System 200 implements a method that can guarantee that the retention lock status for a backup file in storage is what it is claimed to be. The overall process is to first get certified retention lock status, and the second part is to perform the audit 222, where auditing is independent of getting the certified status. The storage target holds the backup, and it is locked as per the certified status. The backup software asks for the certified status, which it then stores in a local backup software catalog. An external auditor 222 (using one of three possible methods described below) can ask for the certified retention lock status of the file or files through this catalog. The certified status is signed by the storage target, when the certified status is requested. This certified status is then stored in the catalog of the backup software. Since the status is signed by the storage target, the certified status cannot be tampered with, in the backup software, and if such tampering is done, such tampering will be discovered. The audit can be done on demand and any desired number of times, and of any scope with respect to how few or many backups to audit.

Figure 3:
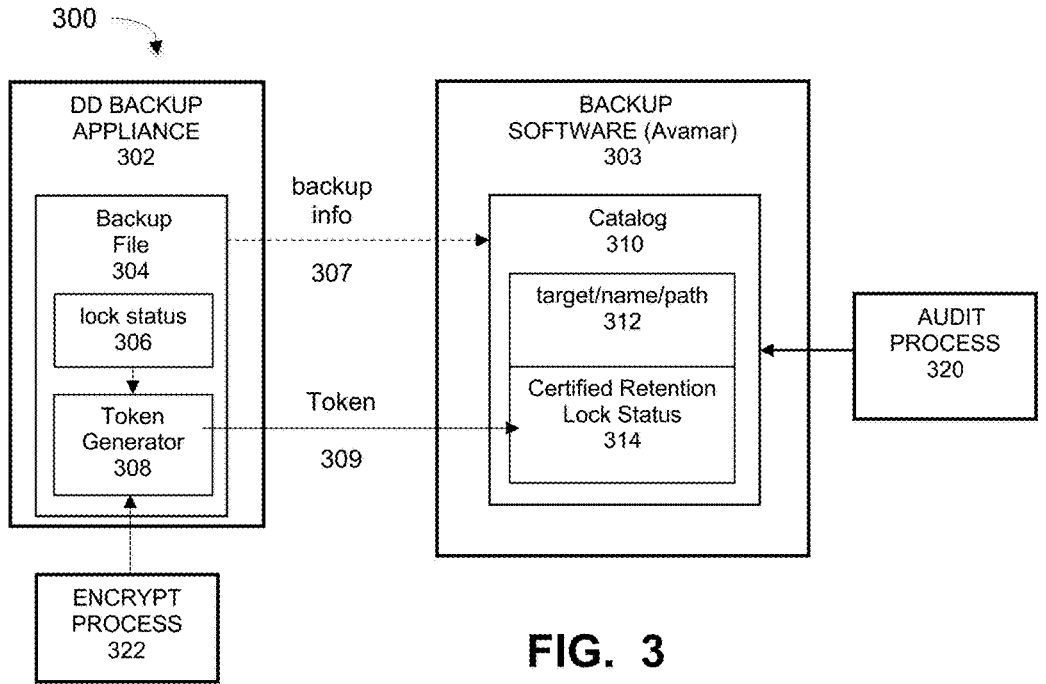
FIG. 3 illustrates processing components and information flow for certifying retention lock status in a deduplication backup system, under some embodiments.

FIG. 3 illustrates processing components and information flow for certifying retention lock status in a deduplication backup system, under some embodiments. For the example system 300 of FIG. 3, a storage target (e.g., DD backup appliance) 302 stores a backup file 304 processed by backup software (e.g., Avamar) 303, as executed by or embodied within a backup server (e.g., 102). In general, the terms backup appliance and backup server may be used interchangeably and generally refer to appliance 302, which can include storage media and a filesystem to store files.

This backup file can be retention locked depending on system configuration, policies, and/or application needs. A lock status 306 is thus associated with the backup file 304. Certain information regarding this file is stored in a local catalog 310 by the backup software 303. This information 307 can include the name of the backup target 302, the name of the backup file 304, the storage location or file path that locates the file in storage, and so on, 312. The retention lock status 306 as indicated in the backup file 304 can also be stored in the catalog as a retention lock status 314 for the file.

As an example, assume that a backup containing file "cur/CID/B2/c21.cdsf" is stored in the storage target 302. This backup information comprising the file name, storage appliance, and path name is stored by the backup software 303 in its catalog 310. If the policy requires the file to be retention locked, the backup catalog 310 is extended to have the following data element: "File cur/CID/B2/c21.cdsf, Retention Lock expiry=Feb. 22, 2023 UTC 21:00:00."

To ensure that this entry in the catalog is secure and therefore trustable, embodiments of system 300 include a cryptographic-based certificate process. For this, the retention lock status entry 314 in the catalog is certified by the backup appliance storage system 302 to create a 'certified retention lock status'. Given that the retention lock status is certified by the signing authority, which is the device 302 actually storing the data, the status can be audited to ensure that the file is indeed locked until a defined time. If there are any discrepancies in the lock state of the file and the status of the file (i.e., if it got modified, or unlinked), this can be discovered.

To prove that the backup application performed retention lock calls, and that the backup metadata is untampered, the certified retention lock status is returned as a token 309 from the backup appliance 302 and stored in the catalog 310. This token can then be examined by an independent audit process 320. Any changes to the retention lock status, which is stored in cleartext, will be discovered when compared against the token. The retention lock status 314 for the file must reflect the retention time as requested by the application. By examining this certified record, the system ensures that the application did request the retention lock and for a desired duration, and that the application metadata regarding the retention status has not been tampered with or otherwise altered.

With respect to ensuring that the backup file 304 is locked and untampered, as an end-to-end test, if the application claims a file is locked, the backup appliance 302 must prove that the file(s) listed in the token are untampered and still locked. The lookup for the file on the filesystem of backup appliance 302 can guarantee this. The final check must be a method to guarantee that the content of the file is untampered. For this embodiment, the certified block of data comprising the certified retention lock status 314 is configured to contain the following metadata:

1. Name (full path) for the file.
2. mtime for the file.
3. The checksum algorithm and the checksum for the file, and
4. The retention lock status.

If the file were to be read and its checksum recomputed, the computed checksum must match the checksum stored in the certified block of metadata. The checksum is the only mathematical way to make sure that the content being verified is identical to the copy that was stored. Any discrepancy found in the audit means that the retention lock setting was corrupted or tampered with, and should not be trusted.

This method enables independent audit of the retention lock status for a file and its data, such as by external auditor 320, and different data elements may be checked by this audit process. Three common levels for audits include (1) metadata audits, (2) metadata and file existence audits, and (3) metadata and file data audits.

For metadata audits, process 320 audits the metadata stored for the file in storage. As an embodiment, the backup catalog which stores the retention lock status can be enumerated. The backups which have the retention policy must have a certified retention lock status, and the certified retention lock status should be as per the policy. This method assumes that the storage filesystem hosting and locking the file is hardened and the file is immutable, once locked. This method is relatively cheap, and can be done at a periodic cadence. Furthermore, this kind of audit can be done, even if storage filesystem hosting the file, is unavailable.

A metadata and file existence audit extends the metadata audit and also reach out to the storage filesystem to make sure that the file exists and is locked for the requested duration. This is a lookup within the filesystem namespace, and can get expensive if the audit encompasses on the order of millions of files.

A metadata and file data audit is the most complete method of auditing. This method generates and uses the checksum stored as part of the metadata to compare against the checksum calculated when the data is read off the filesystem. This means reading data off the filesystem, and running the data through a hashing function to generate a checksum. Embodiments store the hashing algorithm and the hash as part of the status information.

As described with respect to FIG. 3, a token 309 is used to encode the certified retention lock status that is returned to and stored in the catalog. The backup software 303 requests the lock status 306 of the files from the backup file server hosting the files. A backup is usually a composite of multiple files. In an example, assume that the backup is composed of three files: cur/CID/B2/c21.cdsf, cur/CID/B2/c22.cdsf, and cur/CID/B2/dd2.xml.

After the files are created, the application, such as through a defined policy, requests that these be retention locked. After landing the data, the backup appliance 302 would return the status for those files in response to one or more queries. For this example, there may be three queries that return data items, such as:

```
"Lookup for details on file cur/CID/B2/c21.cdsf:
    mtime : January 10, 2023 10:50:00 AM UTC
        size : 12345678901 bytes
        cksum : CRC32, 0x12345678
        RL Applied: January 10, 2023 11:00:05 AM UTC
        RL Ends : February 09, 2023 11: 00:05 AM UTC"
"Lookup for details on file cur/CID/B2/c22.cdsf:
    mtime : January 10, 2023 11:00:00 AM UTC
    size : 23456789012 bytes
    cksum : CRC32, 0x56781234
    RL Applied: January 10, 2023 11:00:05 AM UTC
    RL Ends : February 09, 2023 11: 00:05 AM UTC"
"Lookup for details on file cur/CID/B2/dd2.xml :
    mtime : January 10, 2023 11:00:03 AM UTC
    size : 1234 bytes
    cksum : CRC32, 0xA1B2C3D4
    RL Applied: January 10, 2023 11:00:05 AM UTC
    RL Ends : February 09, 2023 11: 00:05 AM UTC"
```

In an embodiment, an application programming interface (API) is used to get the status and the certified retention lock status (token) for a set of files. An example API, may have the following definition:

```
error = get_certified_retention_status(ConnectionHandle,
    FilePaths,
    retToken),
```

Here, FilePaths is a list of files that were previously retention locked. For the example above it would be a list of files cur/CID/B2/c21.cdsf, cur/CID/B2/c22.cdsf and cur/CID/B2/dd2.xml. The backup filesystem would create a cleartext buffer, which would contain the status of the files requested, that is:

```
cleartext = "filename: cur/CID/B2/c21.cdsf
    mtime : January 10, 2023 10:50:00 AM UTC
    size : 12345678901 bytes
    cksum : CRC32, 0x12345678
    RL Applied: January 10, 2023 11:00:05 AM UTC
    RL Ends : February 09, 2023 11:00:05 AM UTC
    filename: cur/CID/B2/c22.cdsf
    mtime : January 10, 2023 11:00:00 AM UTC
    size : 23456789012 bytes
    cksum : CRC32, 0x56781234
    RL Applied: January 10, 2023 11:00:05 AM UTC
    RL Ends : February 09, 2023 11:00:05 AM UTC
    filename: cur/CID/B2/dd2.xml
    mtime : January 10, 2023 11:00:03 AM UTC
    size : 1234 bytes
    cksum : CRC32, 0xA1B2C3D4
    RL Applied: January 10, 2023 11:00:05 AM UTC
    RL Ends : February 09, 2023 11:00:05 AM UTC"
```

In an example embodiment, for the token 309, the token generator 308 uses one of the two methods described below. For the token type 1 the filesystem would hash the cleartext data using a known hash algorithm (for example SHA2), and then encrypt the hash using the filesystem's private key. The encrypted hash and the cleartext is then returned to the caller 303 as part of the retToken, which can be stored in the catalog 310 for the backup.

For the token type 2 the filesystem would encrypt the entire status using the filesystem's private key. The encrypted text is then returned to the caller 303 as part of the retToken, which can be stored in the catalog 310 for the backup. In both of these methods, it is easy to detect if the cleartext is modified or corrupted. In case of token type 1, the encrypted payload can be decrypted with the public key and the hash of the cleartext compared against the decrypted payload which is part of the token. In the case of token type 2, the decrypted payload is the certified cleartext.

For purposes of description, the entity requesting the retention lock status, such as backup software 303 is referred to as a "caller" or "requestor," and may be any process, component, or program that makes a request to an entity setting or certifying the retention lock status.

In some cases, the lock on files must be extended through a process known as retention lock extension. Providing lock extensions in the past has required making file-by-file extension request to the filesystem hosting the files, which can be a very time-consuming process. Present embodiments overcome this disadvantage by providing a process that locks and issues new certifications at the same time. A token may host one or more files, so such a token may be sent to the fileserver with the request for an extension. The fileserver would then extend the lock, and reply back with the new token. A sample API for the extension request may be as follows:

```
error = get_certified_retention_extension(ConnectionHandle,
    extension_time,
    Token,
    retToken).
```

Figure 4:
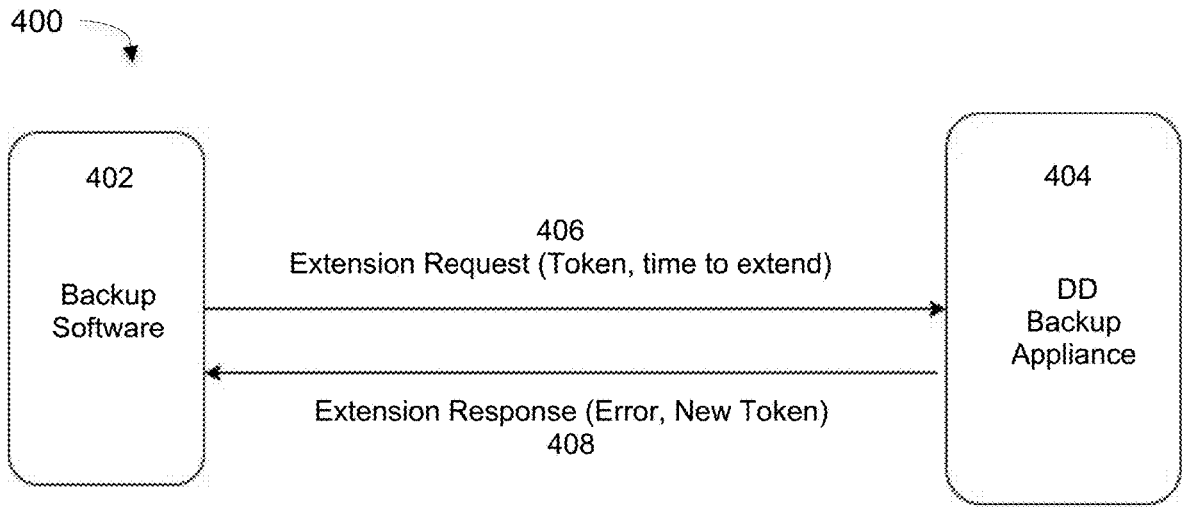
FIG. 4 illustrates use of a token for retention lock extensions, under some embodiments.

FIG. 4 illustrates use of a token for retention lock extensions, under some embodiments. As shown in FIG. 4, system 400 includes backup software 402 and backup appliance 404. The backup software 402 sends an extension request 406 including the token, and the extension time, and in response, the backup appliance 404 sends back an acknowledgement (Ack) signal including a new token as the response, 408. The advantage of this method is that the token already contains the list of files which must have their locks extended, so that only one request 406 needs to be sent over to the appliance 404. Since the token in the request was encrypted by the filesystem, the filesystem can decrypt, process and respond with the new token and the returned token is stored in the catalog.

Figure 5:
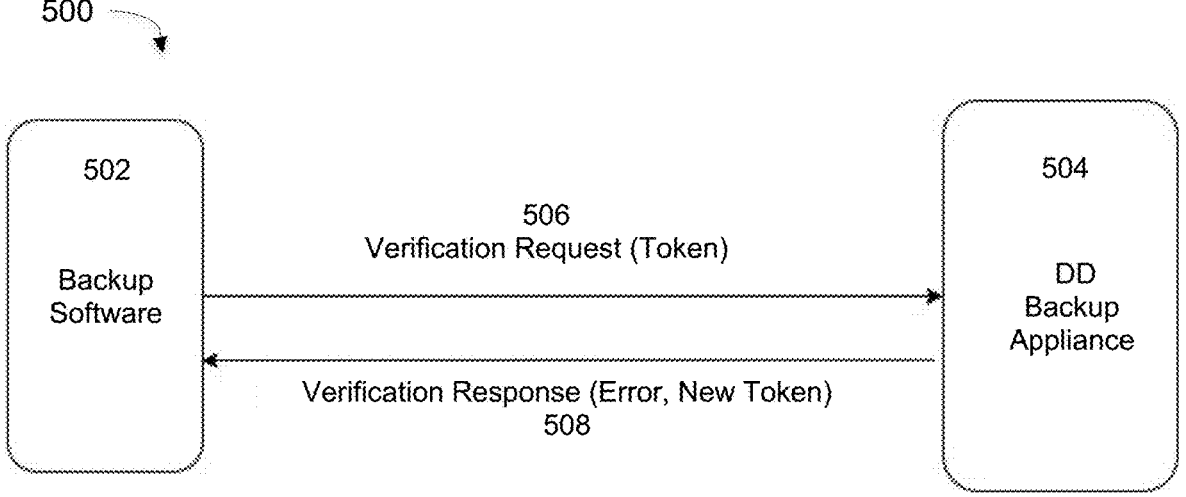
FIG. 5 illustrates use of a token for retention lock verification requests, under some embodiments.

There may be workflows that require periodic verification of the retention lock status of a given backup (set of files). In an embodiment, the client/application would request the filesystem to verify the state of the file by sending the token. The filesystem knows how to decrypt the encrypted parts of the token and discover the list of the files which need to be verified. In general, the backup server should always have the data, but the retention lock period may be different, due to the fact that they can be extended, if desired. For example, a token may have a retention period ending August 1, but the data may actually be stored until October 1 through a retention lock extension. FIG. 5 also illustrates how to verify many files at once (in bulk) as all of the individual files are defined in the token.

FIG. 5 illustrates use of a token for retention lock verification requests, under some embodiments. As shown in FIG. 5, system 500 includes backup software 502 and backup appliance 504. The backup software 502 sends a verification request 506 including the token, and in response the backup appliance 504 sends back an acknowledgement (Ack) signal including an error message (if any) and a new token response 508. The advantage of this method is that this could be a compound request for several files in one iteration.

As mentioned above, the retention lock (RL) event on a file and certification request are independent of each other. The RL event is performed before first certification request by an audit, or the RL on the file does not exist. A verification request can happen any number of times. The verification by an audit process can be requested at any time, and any number of times. The backup storage target does not need to keep the issued tokens, instead they are kept by the backup software in a catalog.

Figure 6:
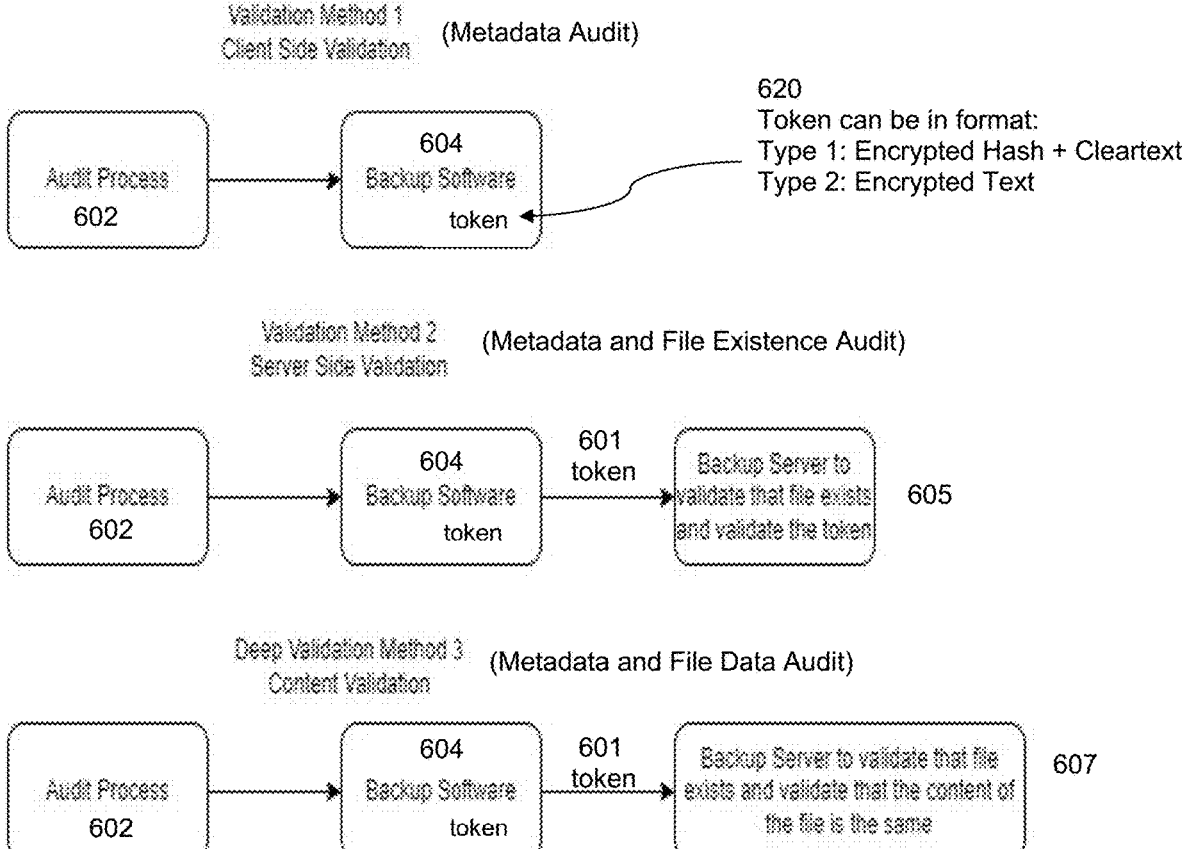
FIG. 6 illustrates various methods to perform validation by an audit process of an RL certificate signed by the storage target, under some embodiments.

FIG. 6 illustrates various methods to perform validation by an audit process of an RL certificate signed by the storage target, under some embodiments. These methods include a client-side validation (Validation Method 1), a server-side validation (Validation Method 2), and a content validation (Deep Validation Method 3). In each validation method, an audit process 602 requests a token 601 from the backup software 604. As shown in legend 620, the token can be in one of two formats: type 1: encrypted hash plus cleartext, or type 2: encrypted text, each of these are referred to as a specific 'token type.'

The three methods of FIG. 6 correspond to the three different audit processes listed above, namely: (1) metadata audits, (2) metadata and file existence audits, and (3) metadata and file data audits. For Validation Method 1, the audit process 602 uses the token stored in the backup software 604, which is a metadata audit. For Validation Method 2, the audit process 602 uses the token stored in the backup software 604, and the backup software 604 sends token 601 to the backup server and the backup server validates the existence of the file 605, which is a metadata and file existence audit. For Validation Method 3, the audit process 602 uses the token from the backup software 604, and the backup software 604 send the token 601 to the backup server which validates that the file exists and that the content of the file is unchanged 607, which is a metadata and file data audit.

FIG. 7A illustrates a cryptographic certificate process for the first type of token (encrypted hash plus cleartext), under some embodiments. For process 700 of FIG. 7A, the cleartext representation of the RL status (i.e., "locked" or "not_locked") 702 is hashed using hashing function 704 (e.g., SHA 256) to produce hash 706. This hash is then encrypted 708 using a signing function by the storage target. The signed hash is then encrypted using a private key 710. The backup catalog 712 stores the encrypted hash 710 and cleartext 702 together, as shown, which corresponds to the type 1 token: encrypted hash plus cleartext.

FIG. 7B illustrates an audit process to validate token type 1 (encrypted hash plus cleartext), under some embodiments. For process 750 of FIG. 7B, the encrypted hash 710 is decrypted using decryption function 756 to produce cleartext hash 760 using a public key. At the same time, the cleartext 702 is hashed using hashing function 758 to produce hash 762. These two hashes 760 and 762 are then compared 764, and if they are they match, the RL state is validated, otherwise it remains unvalidated.

Figure 8A:
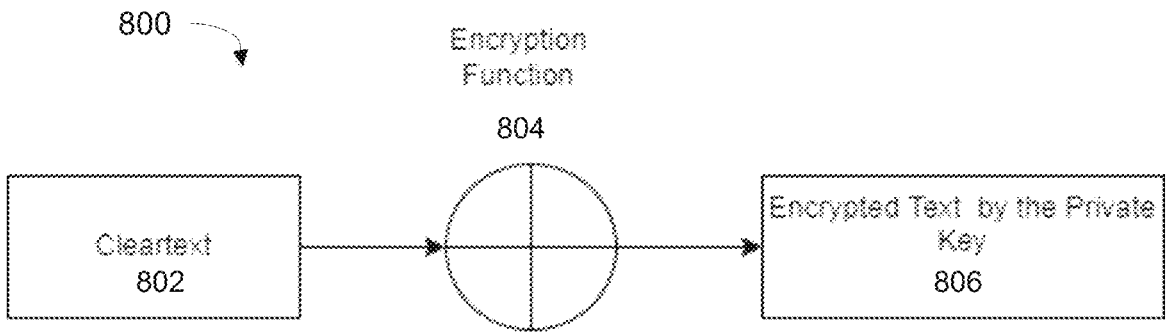
FIG. 8A illustrates a cryptographic certificate process for the second type of token (encrypted text), under some embodiments.

FIG. 8A illustrates a cryptographic certificate process for the token type 2 (encrypted text), under some embodiments. For process 800 of FIG. 8A, the cleartext representation of the RL status (i.e., "locked" or "not_locked") 802 is encrypted 804 using a private key to produce encrypted text 806. The backup catalog 808 stores the encrypted hash 806 only, as shown, which corresponds to the type 2 token: encrypted text.

Figure 8B:
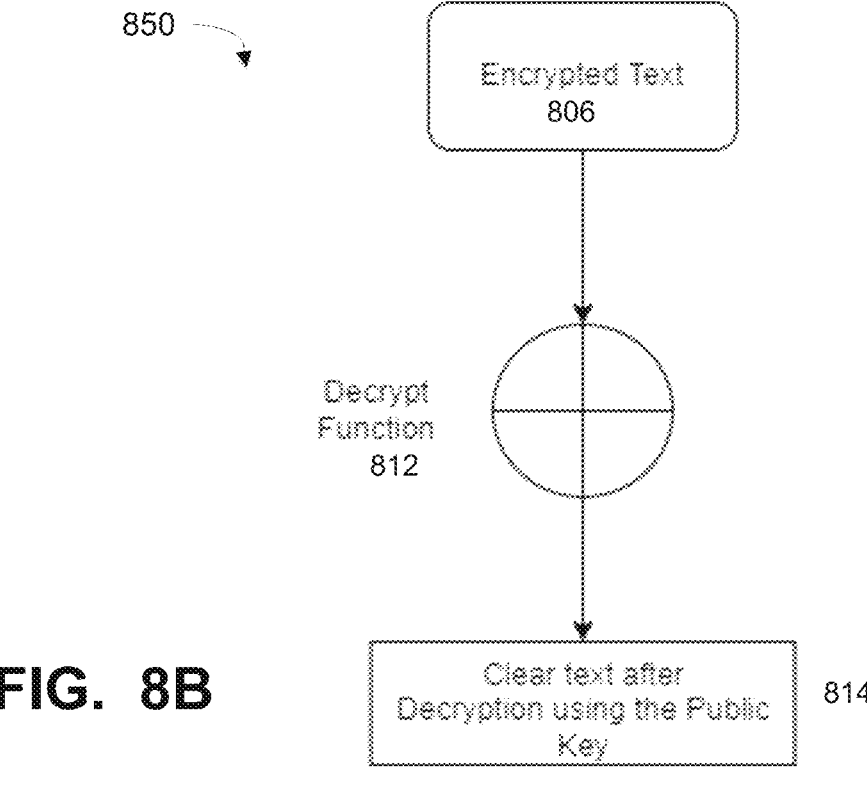
FIG. 8B illustrates an audit process for the second type of token (encrypted text), under some embodiments.

FIG. 8B illustrates an audit process to validate token type 2 (encrypted text), under some embodiments. As shown in process 850 of FIG. 8B, the encrypted text 806 from process 800 is decrypted by the decrypt function 812 using public key to produce the cleartext, 814.

For the audit and validation procedure of the cleartext produced in FIGS. 8A and 8B, the audit process would decrypt the encrypted text to generate the cleartext. The decrypted text would be unintelligible if the encrypted text is tampered with. As an embodiment, the cleartext can host a known magic keyword to ensure the validity of the cleartext, i.e., if the known magic keyword is what it is supposed to be, the rest of the cleartext is also good.

Figure 9:
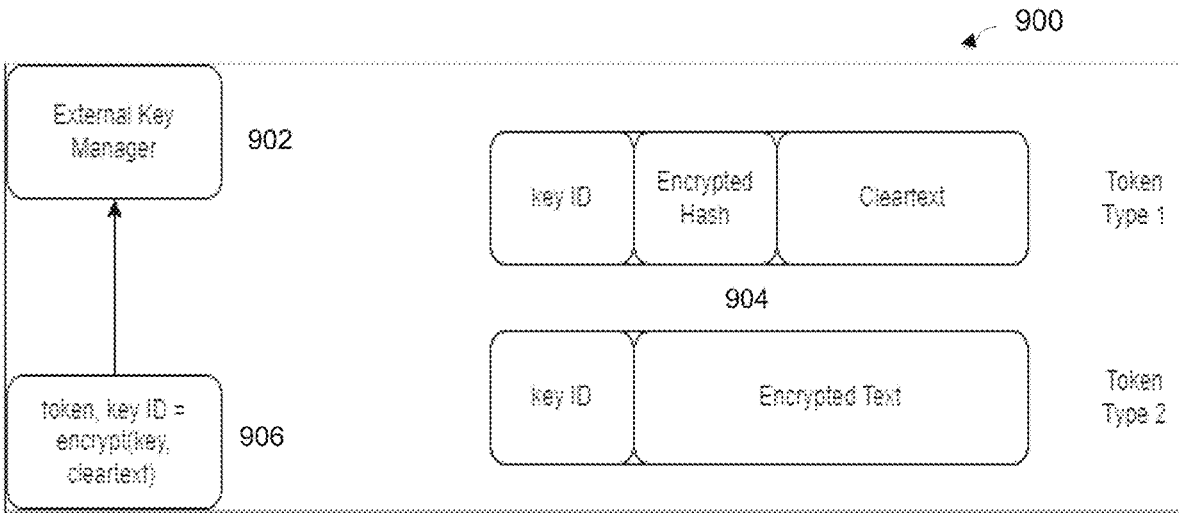
FIG. 9 illustrates an external key manager for generating a token for certifying retention lock status, under some embodiments.

As shown above, certain public key/private key mechanisms may be used for the RL validation process or processes. In some systems, an external public key manager may be used for the encryption process 322. This method assumes that there is an encryption key pair associated with the backup software and the backup appliance. If the encryption key were to change (rotate), the certified retention lock status stored in the catalog will all be undecipherable. FIG. 9 illustrates an external key manager for generating a cryptographic token for certifying retention lock status, under some embodiments. As shown in FIG. 9, system 900 includes an external key manager 902 wherein the key ID defines the key pair which is used to encrypt and decrypt the token, 906. The key ID is embedded in the token, as shown for tokens 904, which comprise a type 1 token and a type 2 token.

Figure 10:
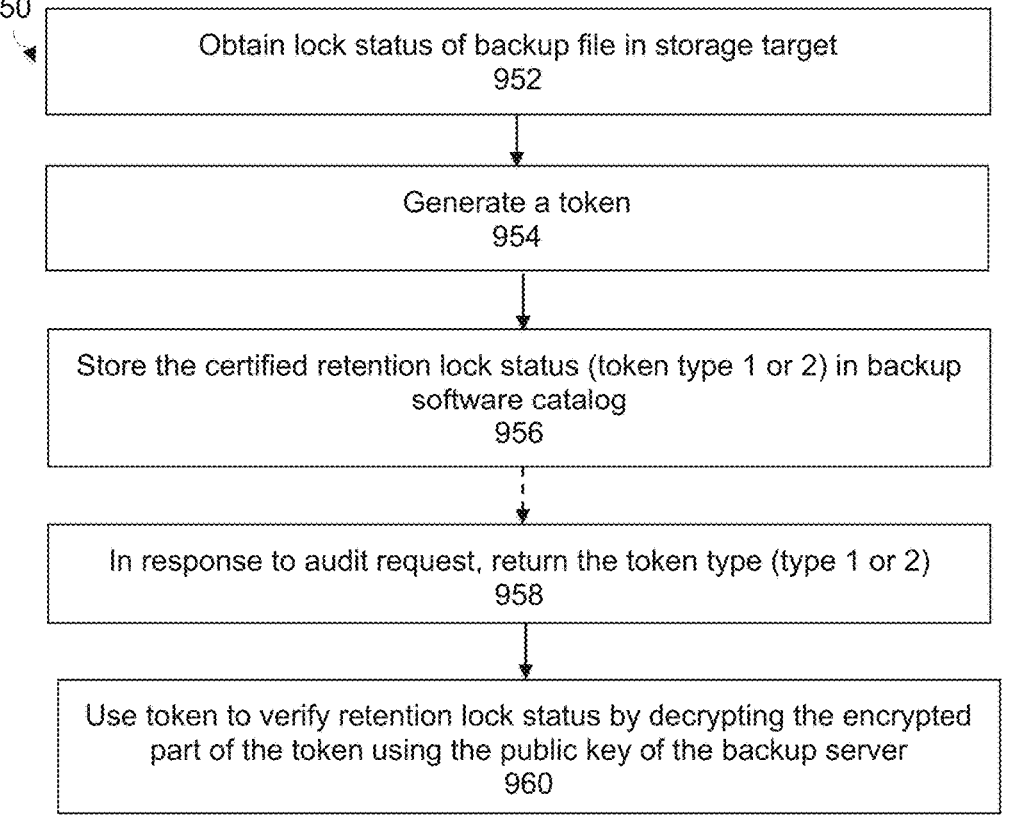
FIG. 10 is a flowchart that illustrates a method of using cryptographic processes to certify retention lock status for files in a deduplication backup system, under some embodiments.

FIG. 10 is a flowchart that illustrates an overall method of using cryptographical processes to certify retention lock status for files in a deduplication backup system, under some embodiments.

As shown in FIG. 10, process 950 starts with obtaining the lock status of a backup file stored in a storage target or appliance, 952. The plaintext of this status information (e.g., Lock or No_Lock, lock time, lock expiry, etc.) is then encrypted using an appropriate encryption key process to create a certified retention lock status, which is provided as a token that is generated, 954. This certified lock status (token type 1 or token type 2) is then stored by in a backup software catalog, and such information is then available for inspection and audit, 956. The retention lock status is essentially certified by the signing authority, who is the backup appliance/storage target, in this case, and is thus trustworthy.

In case of an audit request, the process 950 returns the token (type 1 or type 2), 958. The token is then used to verify the retention lock status by a selected validation method, 960. In this way, the token is used to verify that the application in question actually did request the retention lock, and for a desired duration, and that the application metadata for the status has not been improperly altered (i.e., it has integrity). Any discrepancy found during the comparison is interpreted as a sign of a untrustworthy retention lock setting.

In an embodiment, the validation step comprises validating the token by decrypting the encrypted part of the token using the public key of the backup server.

As shown, embodiments thus provide a cryptographical system and method to capture and certify the retention lock status for a set of given files and associate it with backup metadata for auditing. Different levels of audits are accommodated, and there is a way to securely extend and verify the retention lock status.

Certified Lock Status with Opaque Data

In an embodiment, the certified retention lock status process 950 of FIG. 10 can be extended to host application data that is opaque to the filesystem, allowing the process to store the application data in this immutable form. The opaque data could be any data that could be useful for the application, or just as a corroboration of events as they happen in time. The filesystem will not interpret the opaque section of the payload, but it will include the same when it is returning the encrypted hash (for token type 1), or the encrypted token (for token type 2).

Figure 11:
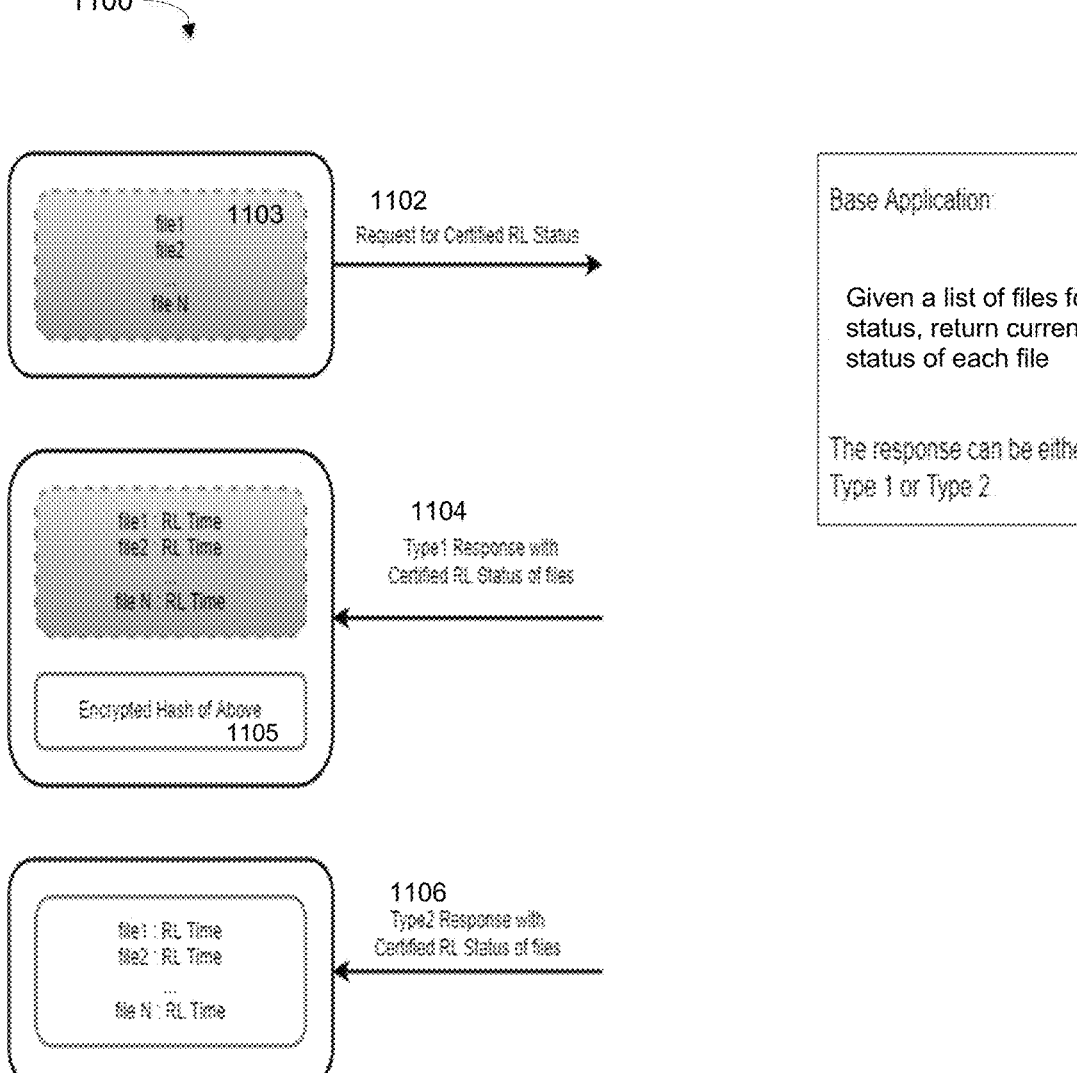
FIG. 11 illustrates a request for certified retention lock status for a group of files, under some embodiments.

FIG. 11 illustrates a request for certified retention lock status for a group of files, under some embodiments. As mentioned above and as shown in system 1100, the request 1102 could cover one file or any practical number of files 1103. The base application 1108 responds to the request for the file or files for which the certified retention lock status is desired by returning the current retention lock status of each file, where the response can be one of two types, token type 1 or token type 2, as shown in FIG. 9.

For a token type 1 response 1104, the backup server responds with the retention lock status for the files in question, and which is an encrypted hash of the cleartext (encrypted by the backup server's private key) 1105.

For a token type 2 response 1106, only the encrypted payload comprises the response text for the request. The encrypted payload can be decrypted by the requesting client, using the backup server's public key.

In an embodiment, this lock status request and response process is extended to include opaque data, which is data that the certifier is not concerned with and that will not be interpreted by the filesystem, i.e., it is "opaque" to the backup server filesystem. This method could be used by the backup client to store and certify certain private data, which has relevance to its upkeep. Opaque data may be data that is automatically recognized as non-interpreted data based on its content or format, or it may be data that has been tagged or otherwise indicated to be opaque data. The opaque data comprises data that proves that the owner of the data had the data at or before a time "t" when the certifier signs the data. That is, opaque data is part of the request for certification, as it is part of the token certifies that it said data was presented to the certifying authority (e.g., DD). For example, opaque data may be an encrypted hardware clock time and upon decryption, the event in the opaque data is guaranteed to be at the hardware clock time.

Figure 12:
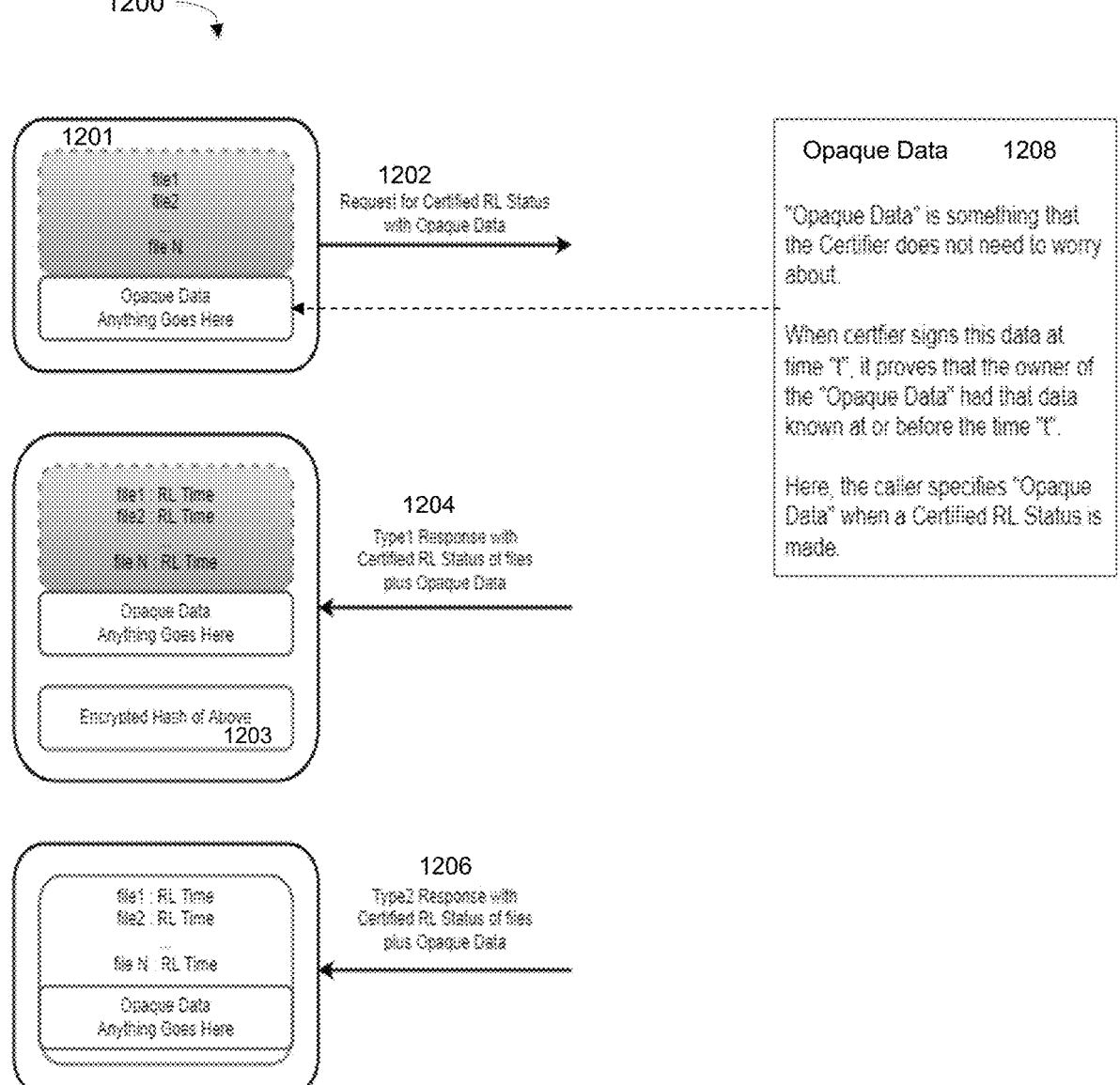
FIG. 12 illustrates a request for certified retention lock status for files with opaque data, under some embodiments.

FIG. 12 illustrates a request for certified retention lock status for files with opaque data, under some embodiments. As shown in FIG. 12, a request 1202 for the RL status of one or more files (file1 to fileN) 1201 is sent along with opaque data 1208. In general, the opaque data is data that the caller understands and may not be related to any of the files (e.g., 1201). As shown in system 1200, the request 1202 to obtain the certified retention lock status of the files 1201 thus includes specifying the opaque data 1208 in the request. As described above, the response from the certifier to the caller (or "requestor") may be of either token type 1 or token type 2.

As a response to the request to include the opaque data in the case of a token type 1 response 1204, the encrypted hash 1203 that contains the opaque data with the retention lock status as cleartext. Any modification to the text can therefore be detected by the cryptographic methods, as described above.

If the request was for the token type 2, the response 1206 comprises the encrypted text returned by the backup server including the opaque data 1208. As in the case of no opaque data, the encrypted text can be decrypted using the backup server's public key.

This method and system thus facilitates the efficient processing of retention locked data that includes opaque data, which is data that is not interpreted by the filesystem, and should therefore be more efficiently processed than actual file content.

Although embodiments are illustrated and described with respect to a Data Domain system, which is a purpose-built backup appliance providing streaming deduplication, it should be noted that embodiments are not so limited and any other deduplication backup system may be used. Embodiments of the processes and techniques described above can be implemented on any appropriate backup system operating environment or file system, or network server system. Such embodiments may include other or alternative data structures or definitions as needed or appropriate.

Figure 13:
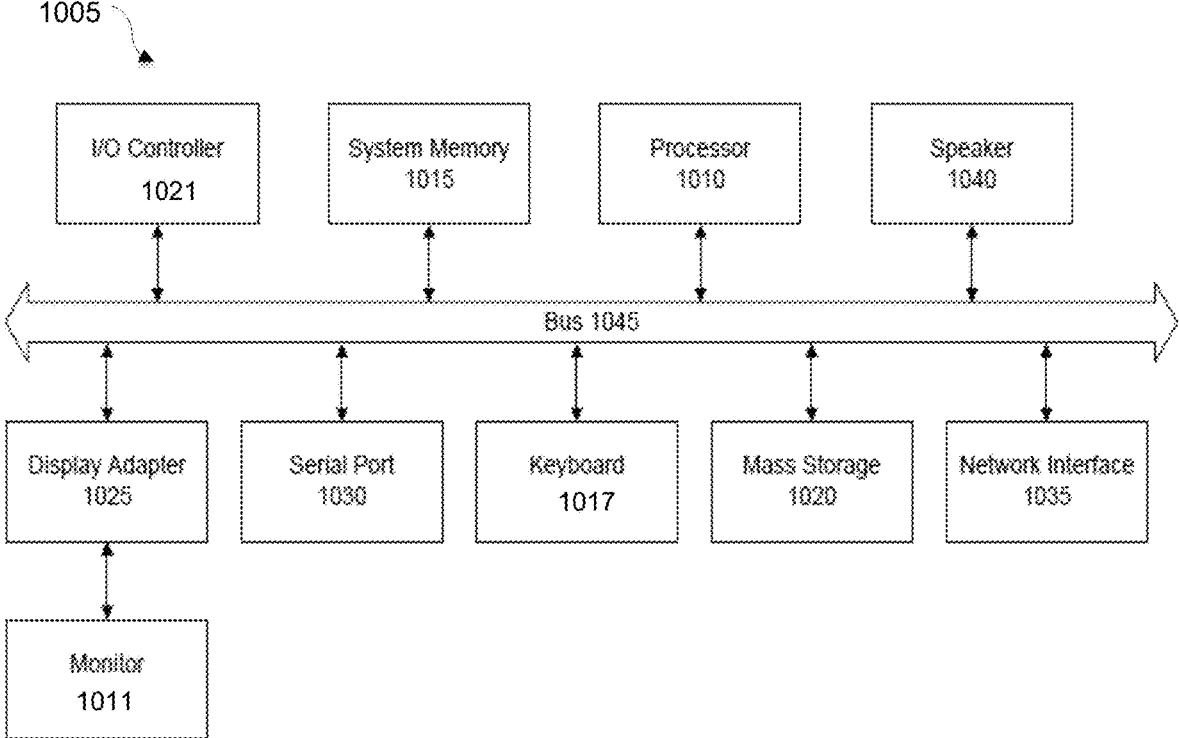
FIG. 13 is a block diagram of a computer system used to execute one or more software components implementing one or more processes described herein, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 13 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 9 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows® family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.x), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method to certify retention lock status of a file in a data store containing opaque data and stored in a storage target of a backup system, comprising:

storing the file in the backup system and subject to one or more compliance standards regarding storage and protection of data including the file;

applying, by the storage target, a retention lock (RL) on the file to define a RL status of the file;

configuring the RL status to contain metadata comprising a name and full path for the file, mtime for the file, a checksum for the file and checksum algorithm, and the RL status;

incorporating the opaque data with a request from a requestor to obtain the RL status of the file the opaque data comprising data in a read payload that will not be interpreted by a filesystem and proving that an owner of the opaque data had the data at or before the certain time, and wherein the opaque data comprises an encrypted hardware clock time to prove a clock time upon decryption;

generating the RL status as cleartext in the storage target;

encrypting the RL status using an encryption key process encrypting the cleartext to create a token encoding the RL status to generate an encrypted RL status;

generating the token encoding the RL status through a process comprising one of hashing the cleartext and encrypting the hash using a filesystem private key, or encrypting the cleartext using the filesystem private key; and providing, in response to the request, the token to a backup software of the backup system along with the opaque data back to the requestor to verify compliance with the one or more compliance standards.

2. The method of claim 1 wherein the token is a first type of token, and wherein the response comprises the certificate and an encrypted hash containing the opaque data with the RL status as cleartext.

3. The method of claim 1 wherein the token comprises a second type of token comprising encrypted text of the RL status plus the opaque data.

4. The method of claim 3 wherein the encrypted text can be decrypted using a public key of a backup server sending the response.

5. The method of claim 1 wherein the RL status includes data items of lock or no lock setting, a lock time of the RL, and a lock duration of the RL.

6. The method of claim 5 wherein the backup system stores the token in a local catalog, and wherein catalog further stores file information including at least one of: storage target name, file name, and file path.

7. The method of claim 6 further comprising performing a validating process to verify that an application actually did apply the RL, at the lock time and for the lock duration, and that application metadata for the RL status has not been improperly altered.

8. The method of claim 1 wherein the RL status is provided in the response simultaneously for a plurality of files.

9. A computer-implemented method to certify retention lock status of a file in a data store containing opaque data and stored in a storage target of a backup system, comprising:

first storing one or more files in the storage target, wherein the files are retention locked according to a lock policy and subject to one or more compliance standards regarding storage and protection of data including the file;

defining opaque data comprising a read payload that will not be interpreted by a filesystem, the opaque data comprising data in a read payload that will not be interpreted by a filesystem and proving that an owner of the opaque data had the data at or before the certain time, and wherein the opaque data comprises an encrypted hardware clock time to prove a clock time upon decryption;

sending a request to obtain a certified retention lock (RL) status of the file to a certifier component of a backup server, wherein the request contains the opaque data, wherein the RL status is generated as cleartext in the storage target, and is configured to contain metadata comprising a name and full path for the file, mtime for the file, a checksum for the file and checksum algorithm, and the RL status;

encrypting the RL status using an encryption key process encrypting the cleartext to create a token encoding the RL status to generate an encrypted RL status;

receiving, in response to the request, a response type encoding the RL status and the opaque data; and generating the token encoding the RL status through a process comprising one of hashing the cleartext and encrypting the hash using a filesystem private key, or encrypting the cleartext using the filesystem private key.

10. The method of claim 9 wherein the response type is a first type comprising an RL certificate and an encrypted hash containing the opaque data with the RL status as cleartext.

11. The method of claim 9 wherein the response type is a second type comprising encrypted text of the RL status plus the opaque data.

12. The method of claim 11 wherein the encrypted text can be decrypted using a public key of a backup server sending the response.

13. The method of claim 9 further comprising:

embodying the RL status as a certificate token of either a first type or second type;

providing, in response to the request, the token to a backup software of the backup system to verify compliance with the one or more compliance standards.

14. A system for certifying retention lock (RL) status of a file in a data store containing opaque data and stored in a backup system by a backup server, comprising:

a storage storing the file in the backup system and subject to one or more compliance standards regarding storage and protection of data including the file;

a hardware clock maintaining a time of actions performed by users of the backup system;

a requestor requesting the RL status of the file in a request that incorporates the opaque data, wherein the opaque data comprises data in a read payload that will not be interpreted by a filesystem, the opaque data comprising data in a read payload that will not be interpreted by a filesystem and proving that an owner of the opaque data had the data at or before the certain time, and wherein the opaque data comprises an encrypted hardware clock time to prove a clock time of an action upon decryption;

a certifier component of the backup server encoding the RL status in a token of either a first type or second type, and wherein creating the token comprises the action proven by the clock time;

a generator generating the RL status as cleartext in the storage target;

an encryptor encrypting the RL status using an encryption key process encrypting the cleartext to create a token encoding the RL status to generate an encrypted RL status;

an interface sending a request to obtain the RL status to the backup server, and receiving back a response type the token encoding the RL status and the opaque data; and generating the token encoding the RL status through a process comprising one of hashing the cleartext and encrypting the hash using a filesystem private key, or encrypting the cleartext using the filesystem private key.

15. The system of claim 14 wherein the token is a first type, and the response comprises an RL certificate and an encrypted hash containing the opaque data with the RL status as cleartext.

16. The system of claim 14 wherein the token is a first type, and the response comprises encrypted text of the RL status plus the opaque data, and further wherein the encrypted text can be decrypted using a public key of a backup server sending the response.

17. The system of claim 14 wherein the RL status includes data items of lock or no lock setting, a lock time of the RL, and a lock duration of the RL.

* * * * *